United States Patent
von Thal et al.

(10) Patent No.: US 6,837,462 B2
(45) Date of Patent: Jan. 4, 2005

(54) BOOM LOAD ALLEVIATION USING VISUAL MEANS

(75) Inventors: German von Thal, Aliso Viejo, CA (US); Gregory Allen Roberts, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/669,753

(22) Filed: Sep. 24, 2003

(65) Prior Publication Data

US 2004/0069904 A1 Apr. 15, 2004

Related U.S. Application Data

(63) Continuation of application No. 10/137,768, filed on May 1, 2002, now Pat. No. 6,651,933.

(51) Int. Cl.[7] ............................................... B64C 1/00
(52) U.S. Cl. ................................. 244/135 A; 244/136
(58) Field of Search ............................ 244/135 A, 136; 396/7, 12; 701/49, 41

(56) References Cited

U.S. PATENT DOCUMENTS 5,326,052 A * 7/1994 Krispin et al. .......... 244/135 A
5,530,650 A * 6/1996 Biferno et al. .............. 701/300
6,651,933 B1 * 11/2003 von Thal et al. ........... 244/136

* cited by examiner

Primary Examiner—J. Woodrow Eldred
(74) Attorney, Agent, or Firm—Harness Dickey & Pierce P.L.C.

(57) ABSTRACT

An aircraft refueling boom load alleviation system uses received light to detect boom displacement and generates a control signal to correct the displacement. Both a set of flight surfaces and a plurality of light imageable targeting sights are disposed on a refueling tube. At least one digital camera converts the light imageable shape of each of the targeting sights to individual pixel images. The pixel images converted by the digital camera are input to a computer system. The computer system recognizes either a displacement of pixel images or a quantity change of pixels between pixel images as a displacement of the refueling tube. The computer system calculates the displacement of any of the pixel images. A signal is generated to control the refueling tube flight surfaces to correct the displacement.

24 Claims, 6 Drawing Sheets

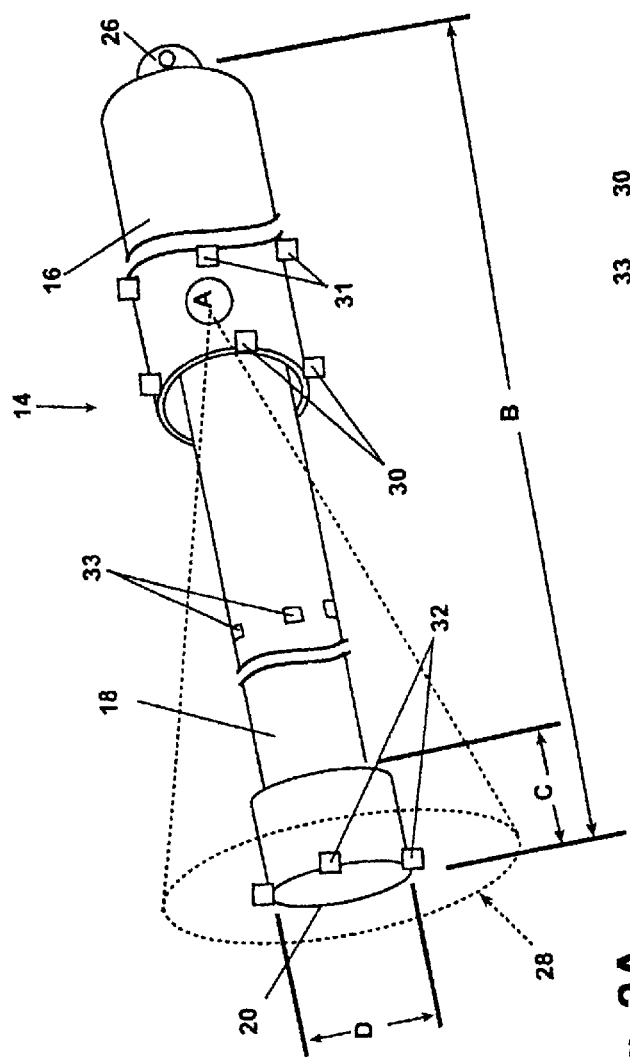
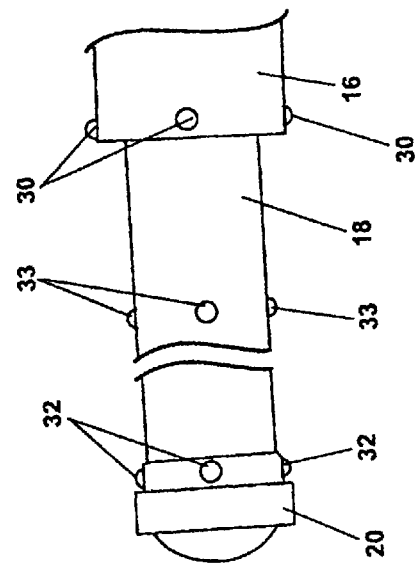
Fig. 2A
Fig. 2B

BOOM LOAD ALLEVIATION USING VISUAL MEANS

CROSS-REFERENCE TO RELATED APPLICATION

This application is a continuation of U.S. patent application Ser. No. 10/137,768 filed on May 1, 2002 now U.S. Pat. No. 6,651,933 (Issue Fee Paid Sep. 23, 2003). The disclosure of the above application is incorporated herein by reference.

FIELD OF THE INVENTION

The present invention relates generally to aircraft refueling booms and more specifically to a system and method to provide boom load alleviation.

BACKGROUND OF THE INVENTION

Aircraft in flight are commonly refueled from a refueling aircraft. The refueling aircraft is typically provided with a boom mechanism or a flexible hose which trails behind the aircraft and physically makes a connection to the aircraft to be refueled. Many refueling aircraft use a system of fixed and extendable metal tubing to provide the fluid connection for refueling an aircraft. For the tube type system, a fixed tube is normally attached to the aircraft and a distal end of the fixed tube provides for an extendable length of tubing. An operator in the refueling aircraft either visually or with the assistance of camera equipment can visually observe the extension of the tubing to align the tubing to the receiving aircraft.

The tube type refueling boom normally has steerable fins or ailerons attached at specific locations to allow the refueling operator to "fly" the refueling boom. Hydraulic controls allow the boom operator to therefore steer the boom towards the aircraft to be refueled.

Once the refueling boom is connected to the aircraft to be fueled, most tube type refueling booms in use do not provide for automatic boom load alleviation. Stresses are placed on a boom due to the motion of the refueling aircraft, as well as from the aircraft to be refueled. These stresses can result in boom failure. In these systems, the boom operator is responsible to continue to steer the boom during the refueling operation whenever the boom appears to be deflecting. A typical boom extends out between approximately 12.2 meters (m) to 15.2 m (40–50 feet) in its fully extended position. It is therefore difficult for the boom operator to visually detect a deflection at the end of the boom adjacent to the aircraft to be fueled. A drawback of manually steering the boom is that boom stresses can build up before the operator is aware of the boom deflection.

A boom load alleviation system employing strain gauges to identify the load on a boom in use is known. This load alleviation system relies on electrical feedback from the strain gauges to a computer onboard the aircraft which identifies a boom bending load. The strain gage signals are analyzed by the computer which provides automatic control to re-steer the boom back to a lower load position. The disadvantage of this strain gauge type load alleviation system is the expense of the equipment, the maintenance of the strain gauge equipment, and the potential for damage to the strain gages since the refueling boom adjacent to the strain gauge installation commonly contacts the aircraft to be refueled.

A need therefore exists for a simplified boom load alleviation system which provides a simpler, less expensive, and more durable system.

SUMMARY OF THE INVENTION

According to a preferred embodiment of the present invention, a boom load alleviation system and method for refueling an aircraft uses a passive visual system to identify refueling boom deflection. The system of the present invention provides at least one digital camera mounted from the section of the aircraft adjacent to a refueling boom fixed attachment point. At least one set of targeting sights is attached to a fixed boom at its distal end in visual alignment with at least one of the digital cameras. At least one set of targeting sights, which are in visual alignment with the same digital camera are attached adjacent to a boom nozzle at the distal end of an extendable boom. The digital cameras each receive pixel images of the targeting sights and the pixel images are relayed to an onboard computer. The computer is previously provided with data tables identifying the length of both the fixed boom and the extendable boom.

When the boom nozzle connects with the aircraft to be refueled, a boom null position is programmed. The null position is the extended but non-deflected position of the refueling boom. The boom load alleviation system thereafter signals for a boom position change when either or both of two boom deflection conditions are present. In one condition, when the pixel images of the targeting sights at the extendable end of the boom change position from the null position, an X or Y coordinate change of the extendable boom targeting sights indicates a boom deflection. In a second condition, when the quantity of pixels identifying an extendable boom targeting sight changes, indicating a targeting sight motion toward or away from the digital camera, a boom deflection is also indicated.

When a displacement between the sets of targeting sights is indicated, the direction and degree of displacement of the extended boom is determined and the computer provides the necessary instructions to the boom operator and/or to an existing (or retrofitted) automatic control system to steer the refueling boom back to its null position. The boom load alleviation system of the present invention is switched between either an On or an Off position. In the On position, the refueling boom is automatically steered to return it to its null position. In the Off position, the boom load alleviation system of the present invention provides an indication to the boom operator of the relative displacement of the boom sections, but the boom operator must manually relocate or "fly" the refueling boom to its null position.

The boom load alleviation system of the present invention also communicates with other sensing systems of the aircraft, including the existing boom elevation, azimuth, and nozzle extension length information sensors. The boom load alleviation system of the present invention is normally in continuous operation to continuously analyze targeting sight data indicating a deflection between the boom fixed tube and the boom extended tube. Continuous feedback to the boom operator and to the boom automatic control system is therefore provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2A is a perspective view of an exemplary extendable tube type refueling boom having the boom alleviation system targeting sights of the present invention;

FIG. 2B is a side elevation view of another embodiment of the present invention having targeting sights adjacent to the boom nozzle in an alternate location from those shown in FIG. 2A;

DETAILED DESCRIPTION OF THE PREFERRED EMBODIMENTS

The following description of the preferred embodiment(s) is merely exemplary in nature and is in no way intended to limit the invention, its application, or uses.

Figure 1:
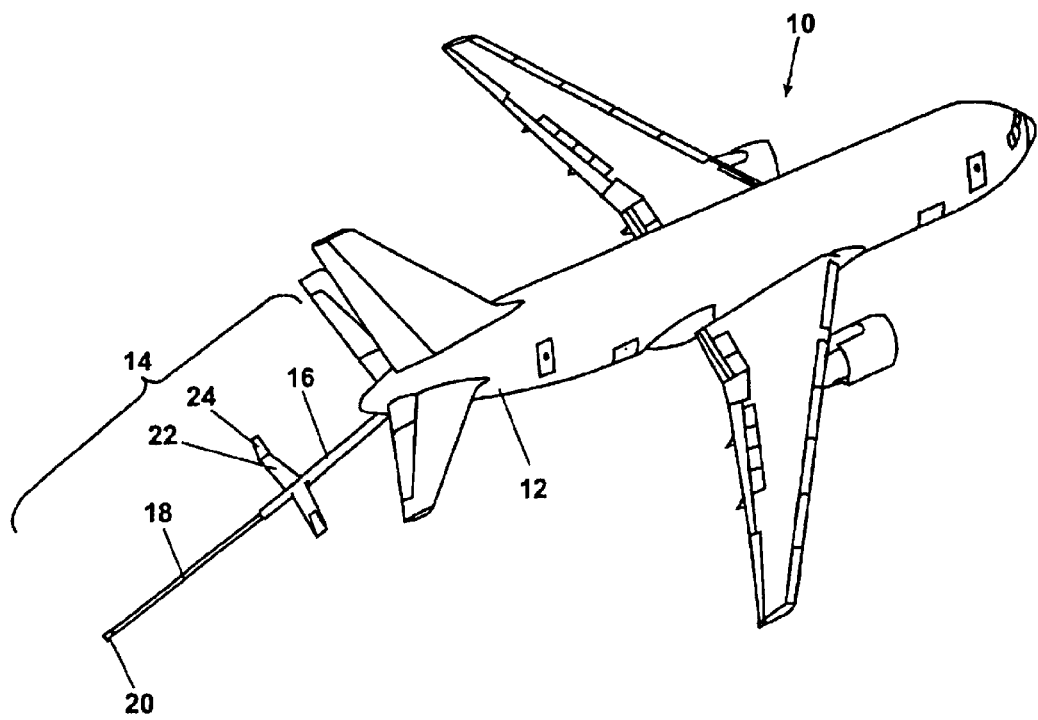
FIG. 1 is a perspective view of a typical refueling aircraft having an extendable tube system for its refueling boom.

Referring to FIG. 1, an aircraft 10 is shown which is typical of a refueling aircraft. From a tail section 12 of the aircraft 10 a refueling boom 14 is deployed. The refueling boom 14 comprises a 2-section boom, the boom fixed tube 16 and the boom extendable tube 18. A connection is made to the aircraft to be refueled (not shown) using a boom nozzle 20. Normally the boom fixed tube 16 is steered by a boom operator (not shown) within the aircraft 10. In one exemplary system commonly used, the refueling boom 14 is steered using control surfaces on at least one boom aileron 22 and at least one boom rudder 24. The boom aileron 22 and the boom rudder 24 control surfaces are controllable using a hydraulic actuation system (shown in phantom in FIG. 5). Other geometries of boom steering surfaces are also employed as known in the art.

Referring to FIGS. 2A and 2B, the refueling boom 14 having targeting sights of the present invention is identified in further detail. As shown in the embodiment of FIG. 2A, the boom extendable tube 18 longitudinally extends from within the larger diameter boom fixed tube 16. The boom nozzle 20 is fixed to a distal end of the boom extendable tube 18. The boom fixed tube 16 is connectably disposed on the aircraft 10 at a boom fixed end 26. The boom fixed end 26 permits the refueling boom 14 to rotate from an upper stowed position (not shown) to the service position shown in FIG. 1 and in a side-to-side motion. An auxiliary support arm (not shown) is commonly provided to assist in raising and lowering the refueling boom 14.

The refueling boom 14 has a fully extended boom length B which varies between a length of about 12.2 meters to about 15.2 meters (40–50 feet). The boom fixed tube 16 normally comprises about 60–75% of the boom length B. This percentage varies with different boom designs. The boom nozzle 20 has a length C of about 30 cm (1 foot) and a diameter D of about 15 cm (6 in). The boom fixed tube 16 is rigidly supported from the aircraft 10 and therefore does not bend for purposes of this discussion. When extended to its maximum extended boom length B, the boom extendable tube 18 can bend within a boom bending envelope 28 as shown, about a bending focal point A as shown. In a typical installation, the boom bending envelope allows about 30.5 cm (12 in) of boom deflection about a centered or "null" position without damage to the refueling boom 14.

In one preferred embodiment of the present invention, the boom fixed tube 16 has two sets of fixed targeting sights, a fixed targeting sight set 30 and a fixed targeting sight set 31, respectively. The fixed targeting sight set 30 is disposed adjacent to the boom fixed tube 16 distal end. The fixed targeting sight set 31 is spaced from the fixed targeting sight set 30 to allow an azimuth and elevation of each targeting sight to be determined, and a subsequent boom fixed tube 16 angle determined. In a preferred embodiment of the present invention, each fixed targeting sight set 30 and 31, respectively comprises four targeting sights, having each targeting sight disposed in about 90 degree increments about the diameter of the boom fixed tube 16.

Similarly, the boom extendable tube 18 in this preferred embodiment has two sets of nozzle targeting sights, a nozzle targeting sight set 32 and a nozzle targeting sight set 33, respectively. The nozzle targeting sight set 32 is disposed adjacent to the boom nozzle 20. The nozzle targeting sight set 33 is disposed on the boom extendable tube 18 spaced from the distal end of the boom fixed tube 16 to allow an azimuth and elevation of each targeting sight to be determined. Similar to the boom fixed tube 16 targeting sight sets, a preferred quantity of four targeting sights are used in each set of the nozzle targeting sight sets 32 and 33. Each targeting sight in the nozzle targeting sight set 32 is disposed in about 90 degree increments about the diameter of the boom nozzle 20. Each targeting sight in the nozzle targeting sight set 33 is disposed in about 90 degree increments about the diameter of the boom extendable tube 18.

Each targeting sight in both the nozzle targeting sight set 32 and the nozzle targeting sight set 33 are preferably in co-linear alignment with one of the fixed targeting sights of each of the fixed targeting sight set 30 and the fixed targeting sight set 31. The quantity of targeting sights used per set can be as few as one, however, to ensure some redundancy and to ensure visibility of at least one targeting sight of each set of targeting sights in the event of a camera failure, it is preferred that four equidistantly spaced targeting sights be used per set. There is no maximum limit of targeting sights in a set.

Referring to FIG. 2B, in another preferred embodiment of the present invention, the targeting sights of each of the fixed targeting sight sets 30 and 31, respectively, and the nozzle targeting sight sets 32 and 33, respectively, are each comprised of light emitting diodes (LEDs). The LEDs each oscillate at a predetermined frequency of about 10 to 20 Hz. The oscillation frequency is selected to minimize false alarms of the system by providing a known modulation frequency which differentiates a targeting sight from any other reflected or local light source. In this embodiment, each of the targeting sights generates its own light source.

The nozzle targeting sight set 32 is most susceptible to damage due to its location adjacent to the boom nozzle 20, which can often impact with the aircraft to be refueled (not shown). The nozzle targeting sight set 32 is therefore preferably located as shown in FIG. 2B to protect the target sights against damage. The targeting sights of each set can also be reflectors, a reflective material, or a set of painted emblems or spots, provided targeting sight visibility as reflected light is maintained within the visible wavelengths and into the shortwave infrared (IR) wavelengths as discussed below in reference to aircraft lights.

Figure 3:
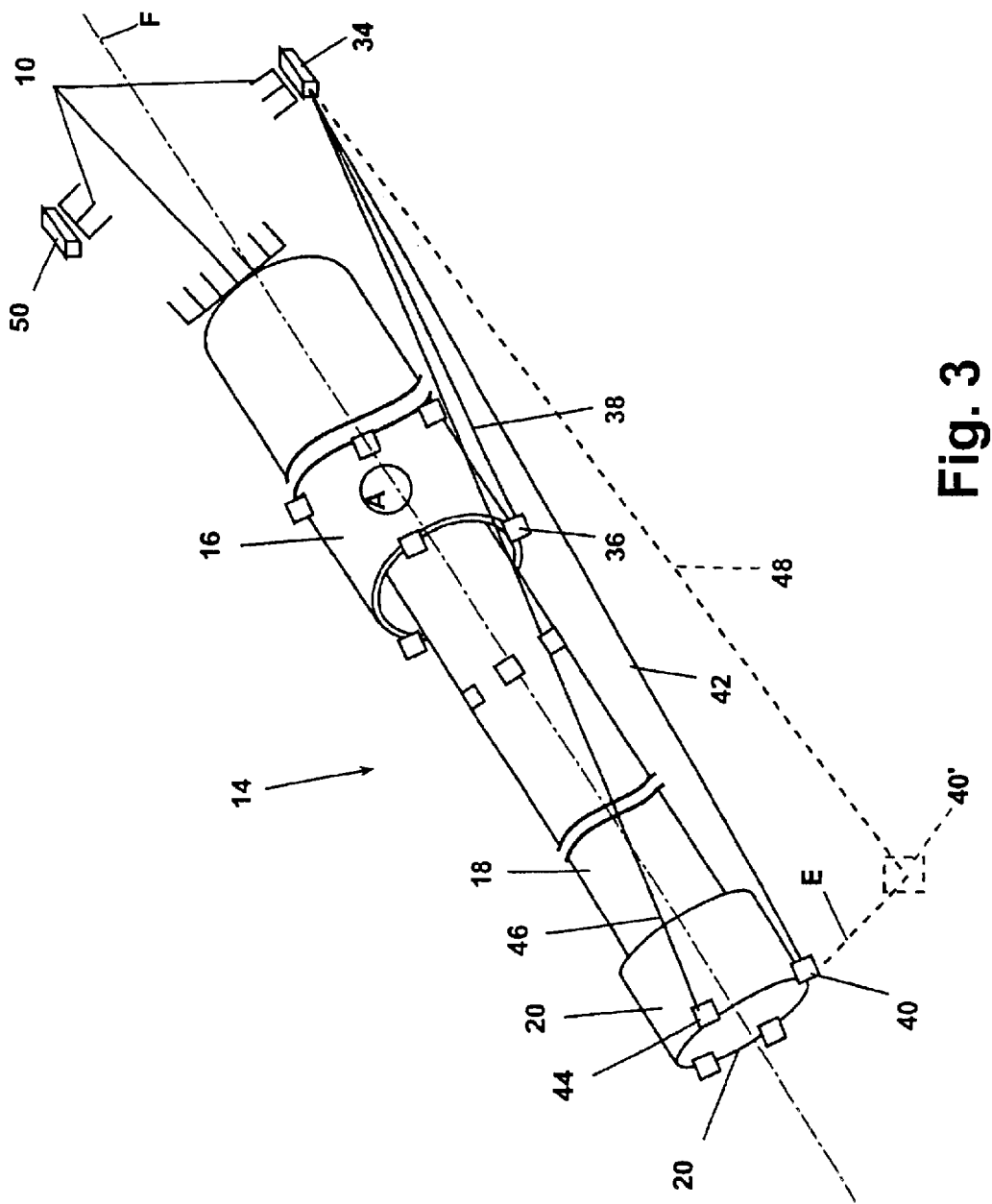
FIG. 3 is a perspective view similar to FIG. 2 showing the digital camera location relative to a select two of the targeting sights.

Referring now to FIG. 3, a digital camera 34 is shown relative to its line-of-sight with selected targeting sights of the refueling boom 14. The digital camera 34 is a silicon type camera, displaying pixel images of each of the targeting sights. These pixel images are communicated to a computer (shown in FIG. 5) commonly provided onboard the aircraft 10, wherein the pixel images are analyzed by the computer. As shown in FIG. 3, a boom targeting sight 36 is in visual alignment along a line-of-sight 38 with the digital camera 34. A nozzle side targeting sight 40 is also in visual alignment with the digital camera 34 along a line-of-sight 42. A nozzle upper targeting sight 44 is in visual alignment with the digital camera 34 along a line-of-sight 46. Location of the nozzle targeting sight sets 32 and 33 adjacent to the boom nozzle 20 as shown maintains an preferred line-of-sight visibility of three of the four targeting sights of each of the nozzle targeting sight sets 32 and 33 respectively by the digital camera 34.

FIG. 3 also shows that a digital camera 50 is mounted on the aircraft 10 about equidistantly from the boom centerline F as the digital camera 34. In this exemplary embodiment of the present invention, the digital camera 34 and the digital camera 50 are separated from each other within a range of about 43 cm to about 56 cm (17 to 22 inches). This separation is sufficient to provide the preferable line-of-sight view with the targeting sights.

Refueling aircraft operate during day and night lighting conditions. Many refueling aircraft use an infrared (IR) floodlight (not shown) for night operation. These floodlights generally operate in the shortwave IR wavelength range. The digital cameras 34 and 50 are therefore preferably capable of operation from the visible light wavelengths and at least into the shortwave IR range of wavelengths (i.e., about 0.7 to about 1.0 micron wavelengths).

According to a preferred embodiment of the present invention, the light from or the reflected image of each targeting sight is contained in a set of pixels which form the images produced by the digital camera 34 or the digital camera 50. As the boom extendable tube 18 bends about its bending focal point A, the boom nozzle 20 rotates about the exemplary deflection curve E as shown. In this exemplary bending motion, the nozzle side targeting sight 40 is displaced to the position shown as the nozzle side targeting sight 40'. At this position, the displaced nozzle side targeting sight 40' is in alignment with the digital camera 34 along a modified line-of-sight 48 as shown.

Based on the positioning geometry of the digital camera 34 relative to the boom nozzle 20, the distance from the nozzle side targeting sight 40 to the digital camera 34 along line-of-sight 42 is greater than the distance from the repositioned nozzle side targeting sight 40' along the modified line-of-sight 48 to the digital camera 34. Since the nozzle side targeting sight 40' in this example is approaching the digital camera 34, the number of pixels subtended for the nozzle side targeting sight 40' increases as the distance between the nozzle side targeting sight 40' and the digital camera 34 decreases. In addition, the X and Y coordinates between the original position of the nozzle side targeting sight 40 and the nozzle side targeting sight 40' in FIG. 3 change. As viewed from the digital camera 34, an X and Y coordinate system for each of the targeting sights is determined and any position change for the boom nozzle targeting sights are interpreted by the computer as a bending deflection of the refueling boom 14.

Referring back to FIG. 1, when a bending deflection is identified for the refueling boom 14, the computer calculates the amount of bending deflection. The boom aileron 22 and the boom rudder 24 are then repositioned by servo-hydraulic control valves (shown in phantom in FIG. 5) in light of the calculated bending deflection to "fly" the refueling boom 14 to a position which reduces its deflection, preferably returning the refueling boom to its null position.

In one preferred embodiment of the invention, three of the preferred number of 4 targeting sights of each set of targeting sights on the boom fixed tube 16 and the boom extendable tube 18 are visible from any one of the digital cameras 34 and 50 respectively. According to the principals of the present invention, any one of the targeting sights located on the boom fixed tube 16 and any one of the targeting sights located on the boom extendable tube 18 that are both within the line-of-sight of one of the two digital cameras 34 and 50 respectively, is sufficient for the boom load alleviation system of the present invention to operate. The digital camera 50 therefore provides a redundant component in the system in the event that the digital camera 34 becomes inoperable.

Figure 4:
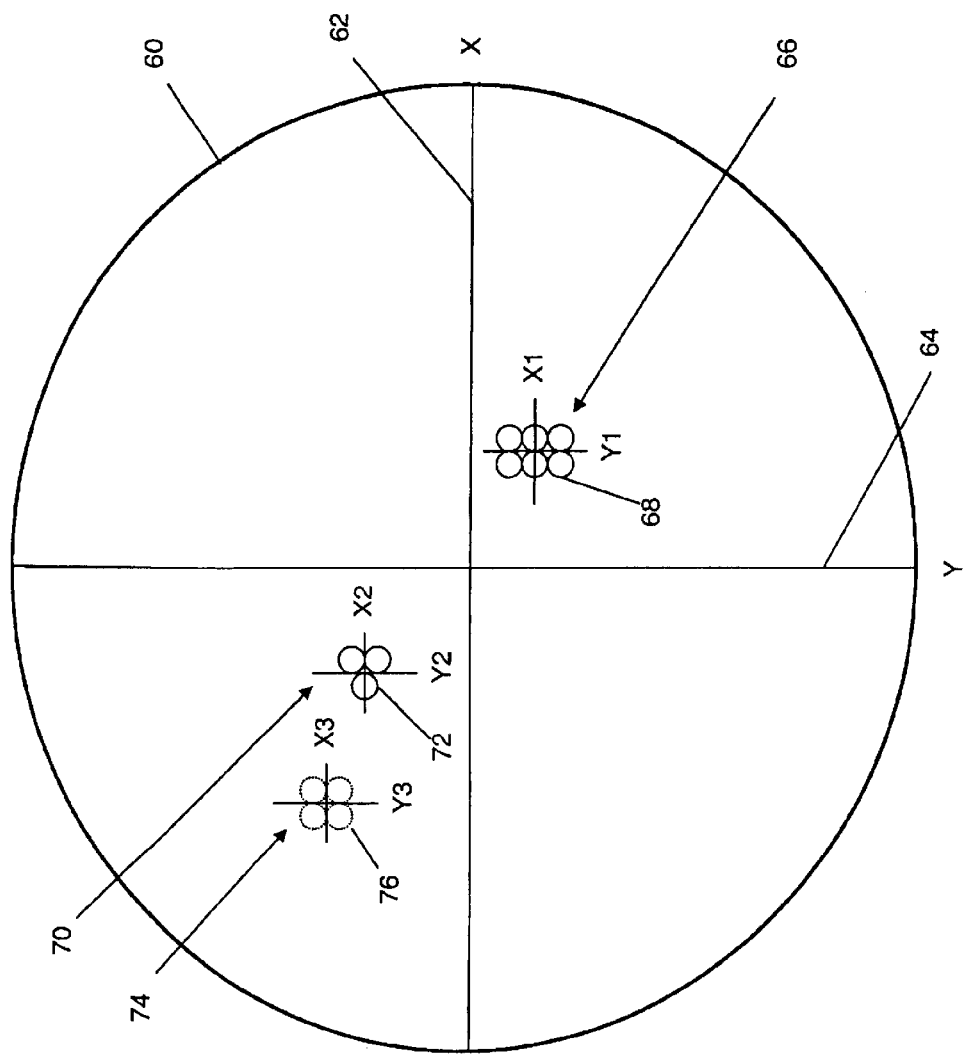
FIG. 4 provides an elevational view from the digital camera perspective identifying both an X/Y coordinate system and a change in pixel quantity used to locate exemplary targeting sights of the present invention.

Referring to FIG. 4, a representation of a digital camera image 60 viewed by the digital camera 34 of the present invention is shown. The field of view of the digital camera image 60 is shown as an exemplary circle. Within the digital camera image 60 is disposed an X axis 62 and a Y axis 64. A fixed targeting sight pixel image 66 represents the boom targeting sight 36 of FIG. 3. Due to its proximity to the digital camera 34, a representative quantity of six pixels 68 are shown, indicating the size of the boom targeting sight 36 visible to the digital camera 34. The fixed targeting sight pixel image 66 is located by an exemplary coordinate set X1, Y1. In a preferred embodiment, the boom fixed tube 16 is treated as a rigid body, therefore the fixed targeting sight pixel image 66 remains at the X1, Y1 coordinates. It is also possible to configure the boom deflection system to treat the boom fixed tube 16 as a deflecting body, such that a deflection for the entire length of the refueling boom 14 (shown in FIG. 1) is calculated.

FIG. 4 shows a nozzle targeting sight pixel image 70 which represents the location of the nozzle side targeting sight 40 of FIG. 3. The nozzle targeting sight pixel image 70 is representatively shown having three pixels 72 to indicate its relative distance from the digital camera 34 as shown in FIG. 3. A modified nozzle targeting sight pixel image 74 is also shown in FIG. 4. The modified nozzle targeting sight pixel image 74 represents the displaced nozzle side targeting sight 40' of FIG. 3. Because of the displacement along the deflection curve E of FIG. 3, the modified nozzle targeting sight pixel image 74 is represented as four pixels 76, because the nozzle side targeting sight 40' is closer to the digital camera 34 as shown in FIG. 3 and discussed above. The nozzle targeting sight pixel image 70 is located by an exemplary coordinate set X2, Y2. Similarly, the modified nozzle targeting sight pixel image 74 has an exemplary coordinate set X3, Y3.

Based on both the coordinate changes from X2 to X3, and from Y2 to Y3 between the nozzle targeting sight pixel image 70 and the modified nozzle targeting sight pixel image 74, respectively, a bending deflection of the refueling boom 14 is indicated. In addition, since the number of pixels indicated in the image shown in FIG. 4 increases between the nozzle targeting sight pixel image 70 and the modified nozzle targeting sight pixel image 74, the system also interprets this as a deflection of the refueling boom 14.

The computer database is initially loaded with the null or zero position of the refueling boom 14 using data similar to the data shown by FIG. 4. In this exemplary case, the fixed targeting sight pixel image 66 and the nozzle targeting sight pixel image 70 are used as the null position of the refueling boom 14. Any motion from the null position for one or more of the targeting sights at the boom nozzle 20 is interpreted as a deflection by the boom load alleviation system of the present invention. The computer identifies either or both a coordinate change and a pixel quantity change, calculates the amount of deflection from the null position, and provides the necessary data/signal to automatically steer the refueling boom 14 back to its null position.

Figure 5:
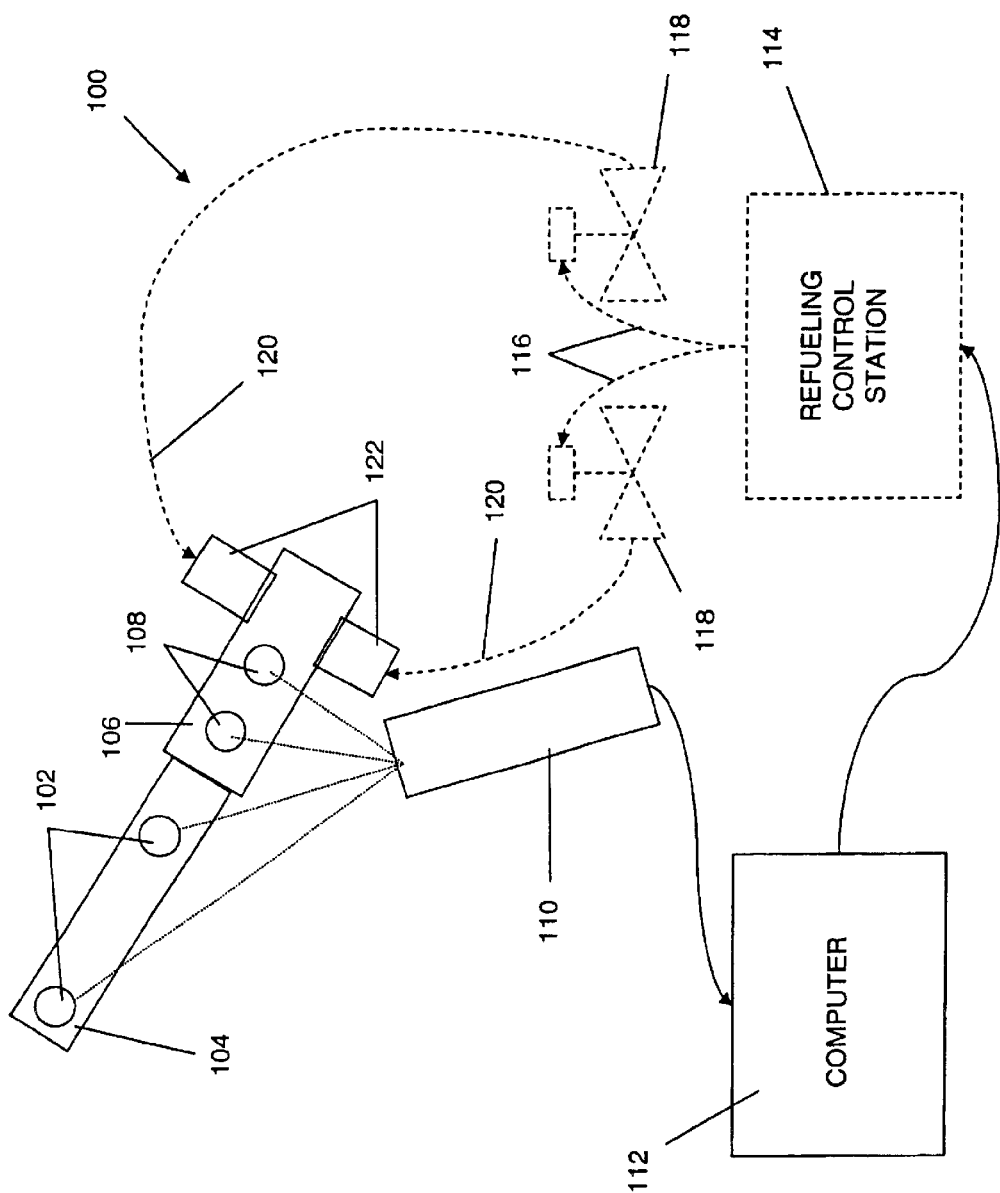
FIG. 5 is a block diagram of an exemplary hardware group in the flow path between the targeting sights and the boom flight surface control for the present invention.

Referring now to FIG. 5, exemplary components of a boom load alleviation system of the present invention are shown. The boom load alleviation system 100 comprises a plurality of extendable tube targeting sights 102 longitudinally positioned on an extendable tube 104. The extendable tube 104 slidably extends from within a fixed tube 106. A plurality of fixed tube targeting sights 108 are positioned on the fixed tube 106. A digital camera 110 receives either reflected or transmitted light images of each of the extendable tube targeting sights 102 and the fixed tube targeting sights 108. The pixel images created by the digital camera 110 for each targeting sight image are relayed to a computer 112 located on the aircraft (not shown). The computer analyzes the pixel images and calculates a bending deflection between the extendable tube 104 and the fixed tube 106. The computer relays a correction signal to an existing (or retrofitted) refueling control station 114 shown in phantom.

The refueling control station 114 is in communication via a plurality of signal lines 116 with each of a plurality of servo-hydraulic valves 118 (also shown in phantom). The servo-hydraulic valves 118 control flow of hydraulic fluid in a set of hydraulic lines 120 to each of a set of flight control surfaces 122 mounted on the fixed tube 106. The flight control surfaces 122 reposition the fixed tube 106 to correct any deflection between the fixed tube 106 and the extendable tube 104.

Figure 6:
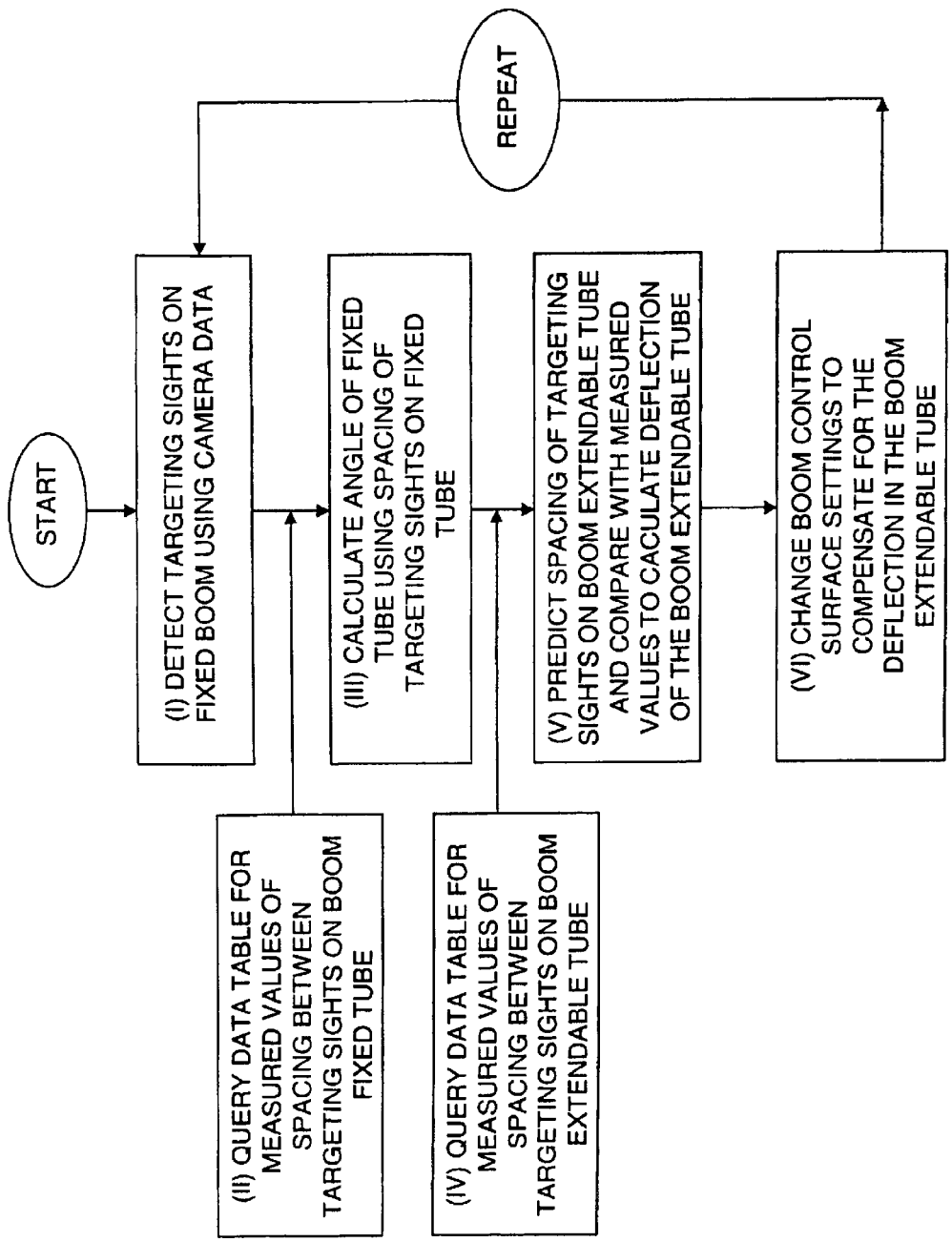
FIG. 6 is a block diagram identifying the sequence of steps required for the boom load alleviation system of the present invention.

Referring now to FIG. 6, an exemplary sequence of operational steps performed by the computer 112 of the present invention is described. In step 124, the targeting sights on the refueling boom are detected using the digital camera data, providing azimuth and elevation of each targeting sight. In step 126, a data table is queried for measured (known) values of the spacing between the fixed tube targeting sights and data from the boom elevation, azimuth, and nozzle extension length information sensors. In step 128, the measured values of the fixed tube targeting sights' spacing and data from the boom elevation, azimuth, and nozzle extension length information sensors is compared to the digital camera data to calculate an angle of the fixed tube. In step 130, a data table is queried for measured (known) values of the spacing between the extendable tube targeting sights allowing an aspect of the extendable tube to be determined. In step 132, the measured values of the extendable tube targeting sights' spacing are used with the previously calculated angle of the fixed tube to predict a spacing for the extendable tube targeting sights along the fixed tube angle. The digital camera data for the extendable tube targeting sights' spacing/location is compared to the predicted spacing, and an extendable tube deflection is calculated. In step 134, the calculated deflection is converted to a control signal which is forwarded to the boom control station, which signals repositioning of hydraulic control valves which hydraulically reposition the flight control surfaces of the refueling tube (see FIG. 5).

It is preferable that a digital camera design be used for the digital camera 34 and the digital camera 50 so that digitized images be available of the targeting sights. On some existing aircraft, one or more analog cameras are installed for assistance during refueling operations. These analog cameras can also be used in accordance with a further embodiment of the present invention, provided that software be installed in the computer 112 (shown in FIG. 5) which can digitize the images received from each of the analog cameras used. The digitized analog camera images are then provided with coordinate data as discussed herein to locate the targeting sights disposed on the refueling boom.

The boom load alleviation system of the present invention provides several advantages. By using passive light received from targeting sights disposed along a refueling boom, the need for an expensive distance measuring system is precluded. The use of light emitting diodes or reflective targets provides inexpensive and durable equipment to survive the potentially damaging environment of a refueling boom/nozzle. Many refueling aircraft already use at least one analog camera to assist in refueling operations. If necessary, the existing analog camera is replaced by at least one digital camera. A computer is also generally used to analyze data associated with refueling, therefore only the addition of software/programs necessary to receive and analyze the digital camera data are required. The present invention can interface with a variety of flight control surface equipment.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mobile platform refueling system, comprising:
   a refueling boom including a rotatably connectable end and a distal end;
   a refueling nozzle connectable to the distal end of the boom;
   a plurality of targeting sights positionable on the boom; and
   at least one digital camera positionable adjacent the rotatably connectable end of the refueling boom and operable to receive each of a plurality of individual images of the targeting sights and convert each individual image to one of a plurality of pixel images.

2. The system of claim 1, comprising a computer system in communication with the digital camera operable to determine a boom displacement using at least two of the pixel images.

3. The system of claim 2, wherein said boom is deflectable within a maximum allowable bending envelope, the envelope storable in the computer system.

4. The system of claim 3, comprising:
   a set of flight control surfaces postionable on the boom;
   a boom null position being storable in the computer system;
   wherein a difference between the boom displacement and the null position is determinable in the computer system, and a boom flight control signal transferable from the computer system to the flight control surfaces operably corrects the boom displacement.

5. The system of claim 4, wherein the set of flight control surfaces comprises at least a boom rudder.

6. The system of claim 4, wherein the set of flight control surfaces comprises at least a boom aileron.

7. The system of claim 4, wherein the boom comprises an extendable boom having a fixed tube section and an extendable section slidably disposed within the fixed tube section.

8. The system of claim 7, wherein both the fixed tube section and the extendable section include an external surface having a portion of the targeting sights connectable thereon.

9. A mobile platform imaging system, comprising:
an extendable refueling tube including a rotatably connectable end and a distal end;
a refueling nozzle connectable to the distal end of the tube;
a plurality of light imageable targets positionable along an external surface of the tube;
each of the light imageable targets convertible into a pixel image; and
each said pixel image being assignable to a coordinate system.

10. The imaging system of claim 9, wherein the coordinate system defines both an elevation and an azimuth location for each light imageable target.

11. The imaging system of claim 10, wherein the light imageable targets are divisible into each of a plurality of sets disposed circumferentially about the tube.

12. The imaging system of claim 11, wherein each set comprises at least one light imageable target.

13. The imaging system of claim 11, wherein each set comprises four light imageable targets each angularly separable by about 90 degrees about a diameter of the tube.

14. The imaging system of claim 12, comprising:
a first set positionable adjacent a refueling nozzle; and
a second set spatially separable from the first set;
wherein at least one the light imageable targets of the second set is positionable along a line-of-sight with a corresponding one of the light imageable targets of the first set.

15. An aircraft imaging system, comprising:
an aircraft mounted extendable refueling tube having a fixed tube section and an extendable tube section slidably extendable from within the fixed tube section;
at least one camera mountable on the aircraft having a line of sight encompassing at least a portion of the refueling tube, the camera operably creating one of a plurality of digital images and a plurality of video images; and
a computer system in communication with the camera operable to store any of the digital images and the video images as one of a plurality of pixel images;
wherein one of the pixel images corresponding to an extendable tube section surface point is comparable by the computer system to a corresponding refueling tube null position to operably determine a deflection of the extendable tube section.

16. The system of claim 15, wherein the refueling tube is extendable from an aft end of the aircraft.

17. The system of claim 16, wherein the at least one camera comprises a pair of cameras, oppositely positionable about the refueling tube.

18. The system of claim 15, wherein the camera is operable within a light range variable between visible light and ultraviolet light.

19. The system of claim 15, wherein each camera comprises one of an analog camera operably creating the plurality of video images and a digital camera operably creating the plurality of digital images.

20. A system for supplying a fluid to a moving mobile platform from a fluid supply source, comprising:
a two section conduit for supplying the fluid from the fluid supply source to the moving mobile platform, the two section conduit including a first section rotatably fixed to the fluid supply source and a second section longitudinally extendable from within the first section;
at least one targeting sight positionable on the second section of the conduit; and
at least one digital camera for imaging the targeting sight and for converting images of the targeting sight into a plurality of pixel images for assisting in positioning the second section of the conduit relative to the mobile platform.

21. The system of claim 20, comprising a steering device connectable to the conduit for assisting in positioning the conduit relative to the mobile platform.

22. The system of claim 20, wherein each said targeting sight comprises one of a passive reflector and an electrically energized light source.

23. A positioning system used to refuel a mobile platform via a conduit while the mobile platform is moving, from a fluid supply source in communication with the conduit, the positioning system comprising:
the conduit being divisible into a fixed section rotatably connectable to the fluid supply source and an extendable section longitudinally extendable from within the fixed section;
at least one target for identifying a specific location along the extendable section;
at least one camera for imaging the target; and
a controller operable to enter an image of the target into a coordinate system and to signal a corrected position of the extendable section by comparing the specific location along the extendable section to the coordinate system.

24. The system of claim 1, further comprising a second plurality of targeting sights positionable on the refueling nozzle, wherein the at least one digital camera is further operable to receive each of a second plurality of individual images of the second plurality of targeting sights and convert each second individual image to one of the plurality of pixel images.

* * * * *